(12) United States Patent
Virtanen et al.

(10) Patent No.: US 7,407,347 B2
(45) Date of Patent: Aug. 5, 2008

(54) TOOL FOR CHIP REMOVING MACHINING

(75) Inventors: Kaj Virtanen, Fagersta (SE); Gabor Kugler, Fagersta (SE); Jens Bald, Fagersta (SE)

(73) Assignee: Seco Tools AB, Fagersta (SE)

( * ) Notice: Subject to any disclaimer, the term of this patent is extended or adjusted under 35 U.S.C. 154(b) by 36 days.

(21) Appl. No.: 10/908,088

(22) Filed: Apr. 27, 2005

(65) Prior Publication Data

US 2005/0238444 A1 Oct. 27, 2005

(30) Foreign Application Priority Data

Apr. 27, 2004 (SE) .................................... 0401072

(51) Int. Cl.
*B26D 1/12* (2006.01)
*B26D 1/00* (2006.01)

(52) U.S. Cl. ........................... 407/110; 407/30; 407/40; 407/113

(58) Field of Classification Search ................... 407/30, 407/40, 46, 110, 113–116
See application file for complete search history.

(56) References Cited

U.S. PATENT DOCUMENTS

| 80,929 | A | | 8/1868 | Disston | |
|---|---|---|---|---|---|
| 4,443,136 | A | * | 4/1984 | Kemmer | ...................... 407/72 |
| 4,588,331 | A | * | 5/1986 | Yoshinori | ...................... 407/36 |
| 5,004,379 | A | * | 4/1991 | Little | ...................... 407/113 |
| 6,109,152 | A | * | 8/2000 | Hecht | ...................... 82/160 |
| 6,579,043 | B2 | * | 6/2003 | Erickson et al. | ............... 407/35 |
| 6,695,549 | B2 | * | 2/2004 | Hecht | ...................... 407/40 |
| 2002/0057950 | A1 | | 5/2002 | Hecht | |
| 2002/0081165 | A1 | | 6/2002 | Hecht | |

OTHER PUBLICATIONS

European Search Report from corresponding European application.

* cited by examiner

*Primary Examiner*—Willmon Fridie
(74) *Attorney, Agent, or Firm*—WRB-IP LLP

(57) ABSTRACT

A tool for chip removing machining includes a holder and at least one cutting insert received in the holder. The holder is provided with at least one insert pocket, in which the cutting insert is intended to be received, and an opening connected to the insert pocket. The insert pocket has a first holding member provided along the periphery of the insert pocket, and the cutting insert has an anchor section and an edge portion connected to the anchor section. A second holding member is provided along the circumference of the anchor section. The first and the second holding members are intended to cooperate when the cutting insert is mounted in the insert pocket. The periphery of the insert pocket, at least partly, is defined by one or more circular arcs with a common center of rotation. The anchor section is provided with a number of holding members distributed along its circumference, and portions of these holding members located furthest away from of the cutting insert center are defined by circular arcs having a common center of rotation. The circular arcs are located at the same distance from the common center of rotation.

17 Claims, 7 Drawing Sheets

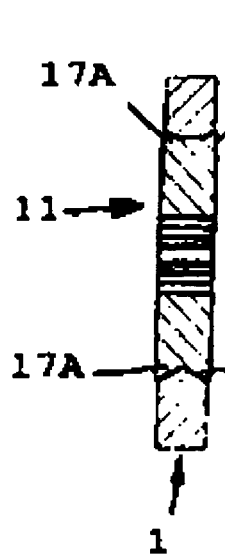
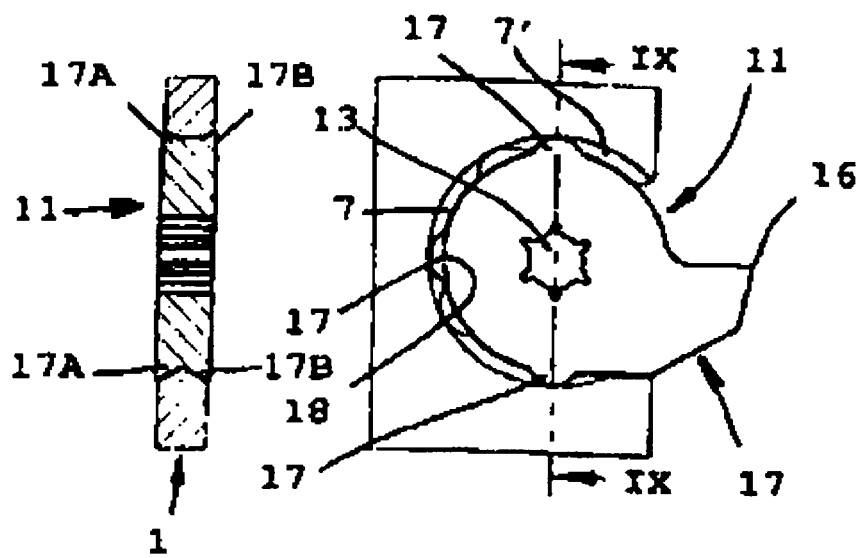
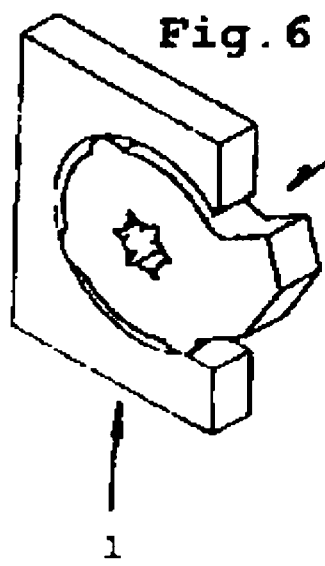
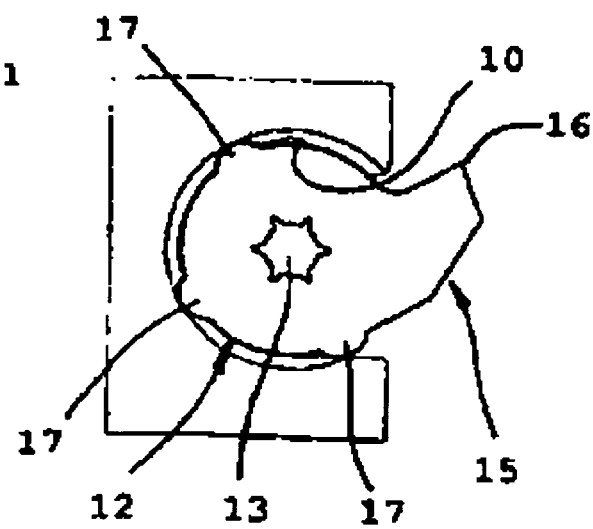
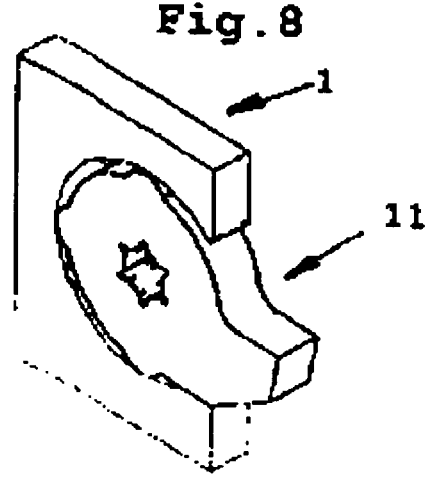

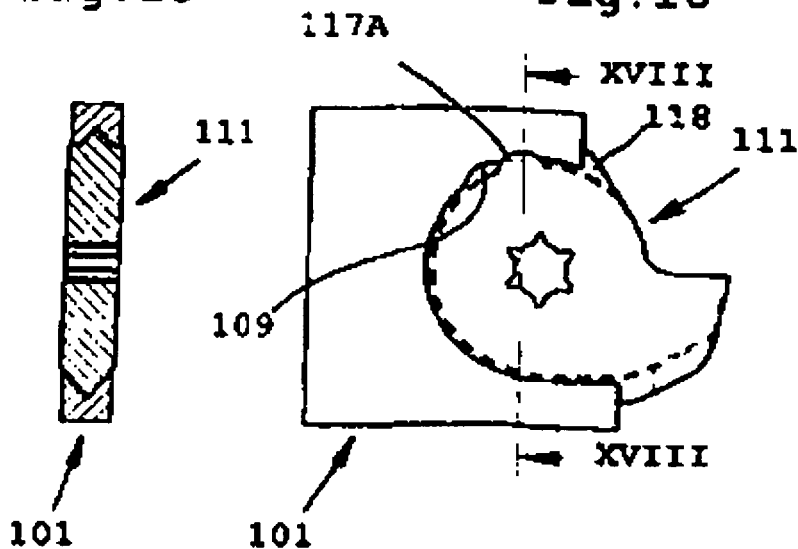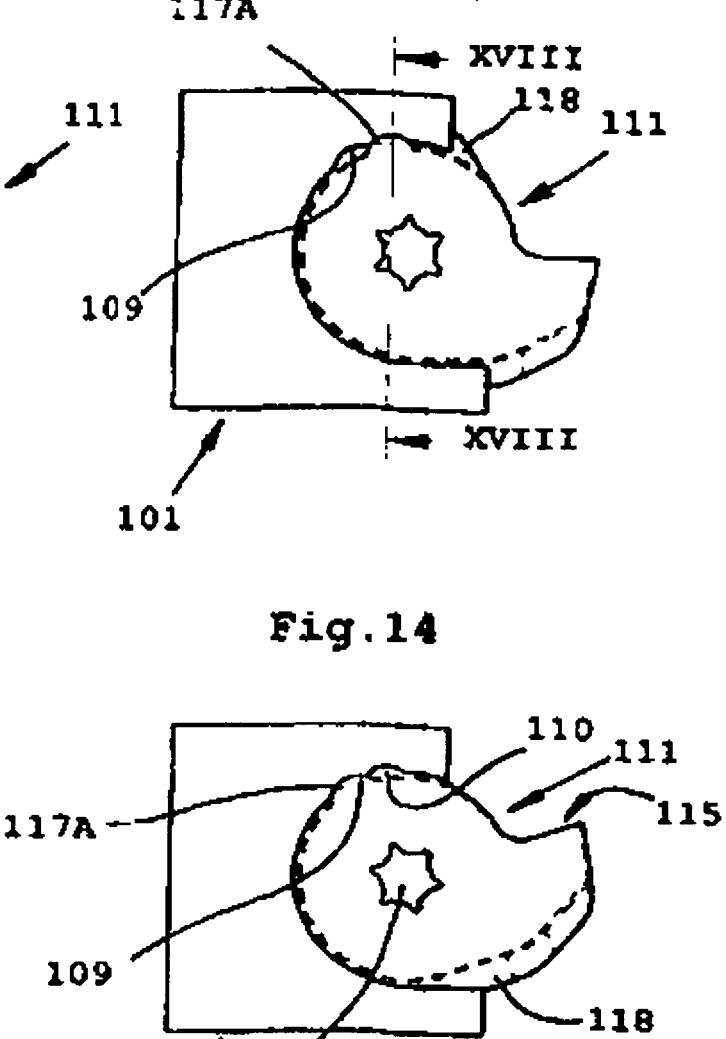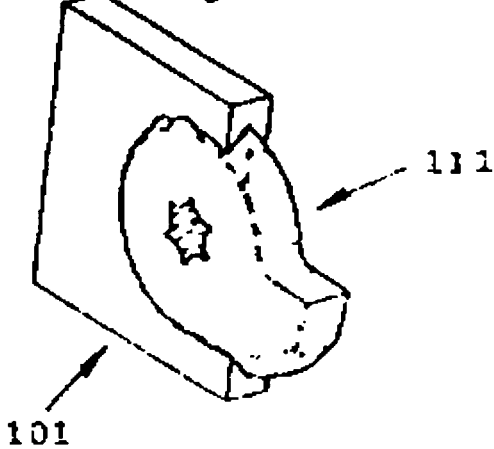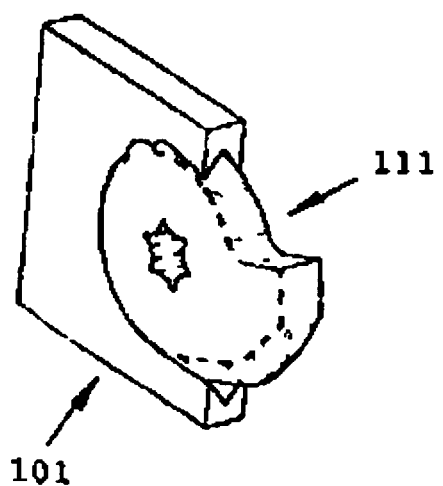

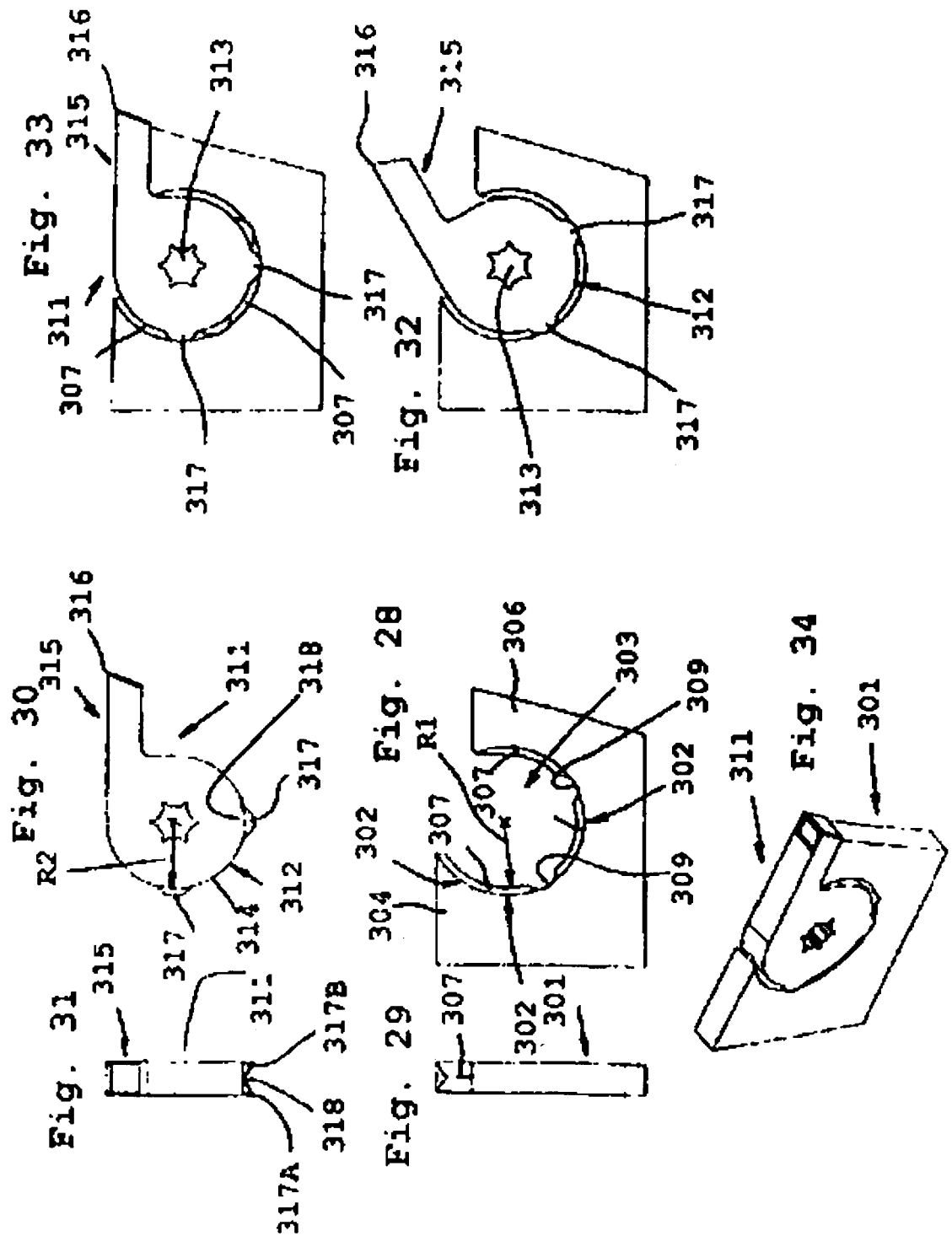

TOOL FOR CHIP REMOVING MACHINING

The present invention relates to a tool and a cutting insert for chip removing machining.

It is previously known through U.S. Pat. No. 4,443,136 to provide a tool for cutting machining, wherein a holder forming a part of the tool is provided with a recess with an opening, in which recess a disc-shaped cutting insert forming a part of the tool is intended to be mounted. The recess is generally circular and provided with either positive or negative guiding means that are intended to cooperate with negative or positive guiding means of the cutting insert, wherein the latter guiding means are provided along a part of the circumference of the cutting insert. These guiding means are made of ridges or grooves. The guiding means are provided diametrically with respect to each other both in the recess and on the cutting insert. The cutting insert has such a shape that it can be moved into in the opening of the recess, whereafter the guiding means are brought to cooperate by rotating the cutting insert around a center axis that generally has an extension across the principal plane of the disc-shaped cutting insert. The clamping of the cutting insert in the holder occurs by means of an eccentric locking principle.

Another known tool, US 2002/0057950 A1, for chip removing machining comprises a holder and a cutting insert mountable in the holder. The holder has a generally cylindrical recess, which is provided with an opening and the cutting insert has a corresponding generally cylindrical section, which is intended to be received by the recess. The cylindrical section is provided with axial ribs, which in mounted state of the cutting insert occupies grooves of the recess. The mounted state of the cutting insert is achieved by rotating the cylindrical section a certain angle around its longitudinal center axis.

A drawback of the above-discussed prior art is i.a. related to lateral stability of the cutting insert in the holder, i.e. there are tendencies of tilting of the cutting insert, especially during longitudinal turning.

It is desirable to provide a tool of the type indicated above, wherein the cutting insert is locked with respect to the holder when it is brought to assume its operative position in the holder.

It is also desirable to provide a tool and an insert where the mounting of the cutting insert in the holder is extraordinarily simple.

It is also desirable to provide a tool and an insert where the cutting insert obtains an extraordinary rigid mounting in the holder.

It is also desirable to provide a tool and an insert whereby the user shall obtain an indication when the cutting insert has obtained a correct, operative position in the holder.

In accordance with an aspect of the present invention, a tool for chip removing machining is provided. The tool comprises a holder and at least one cutting insert received in the holder. The holder comprises at least one insert pocket for receiving the cutting insert and an opening connected to the insert pocket, the insert pocket having a first holding member provided along a periphery of the insert pocket. The cutting insert has an anchor section and an edge portion connected to the anchor section, a second holding member being provided along a periphery of the anchor section. The first and the second holding members are adapted to cooperate when the cutting insert is mounted in the insert pocket. The periphery of the insert pocket, at least partly, is defined by at least one circular arc of the pocket, the at least one pocket arc having a pocket arc center of rotation, and at least a portion of the second holding member located furthest away from a cutting insert center is defined by a circular arc of the insert having an insert arc center of rotation, the insert arc being located at a distance from the insert arc center of rotation.

In accordance with another aspect of the present invention, a cutting insert intended to form part of a tool for chip removing machining is provided. The cutting insert comprises an anchor section and a holding member provided along the periphery of the anchor section. At least a portion of the holding member located furthest away from a cutting insert center is defined by a circular arc of the insert having an insert arc center of rotation, the insert arc being located at a distance from the insert arc center of rotation.

BRIEF DESCRIPTION OF THE DRAWINGS

Below embodiments of the present invention will be described with reference to the enclosed drawings, wherein:

FIG. 5 shows a side view during mounting of the cutting insert in the holder;

FIG. 6 shows a perspective view during mounting of the cutting insert in the holder;

FIG. 7 shows a side view of when the cutting insert is mounted in the holder;

FIG. 8 shows a perspective view obliquely from the front when the cutting insert is mounted in the holder;

FIG. 9 shows a cross-section along the line IX-IX in FIG. 7;

FIG. 14 shows a side view during mounting of the cutting insert in the holder;

FIG. 15 shows a perspective view obliquely from the front during mounting of the cutting insert in the holder;

FIG. 16 shows a side view of when the cutting insert is mounted in the holder;

FIG. 17 shows a perspective view obliquely from the front when the cutting insert is mounted in the holder;

FIG. 18 shows a cross-section along the line XVIII-XVIII in FIG. 16;

FIG. 28 shows a side view of a holder forming a part of the tool at a third alternative embodiment according to the present invention;

FIG. 29 shows a right-hand view of the holder according to FIG. 28;

FIG. 30 shows a side view of a cutting insert forming a part of the tool according to the third alternative embodiment;

FIG. 31 shows a right-hand view of the cutting insert according to FIG. 30;

FIG. 32 shows a side view during mounting of the cutting insert in holder;

FIG. 33 shows a side view of when the cutting insert is mounted in the holder; and FIG. 34 shows a perspective view obliquely from the front when the cutting insert is mounted in the holder.

DETAILED DESCRIPTION

Figure 2:
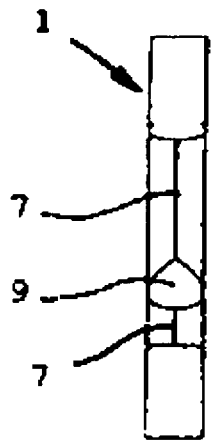
FIG. 2 shows a right-hand view of the holder according to FIG. 1.
Figure 1:
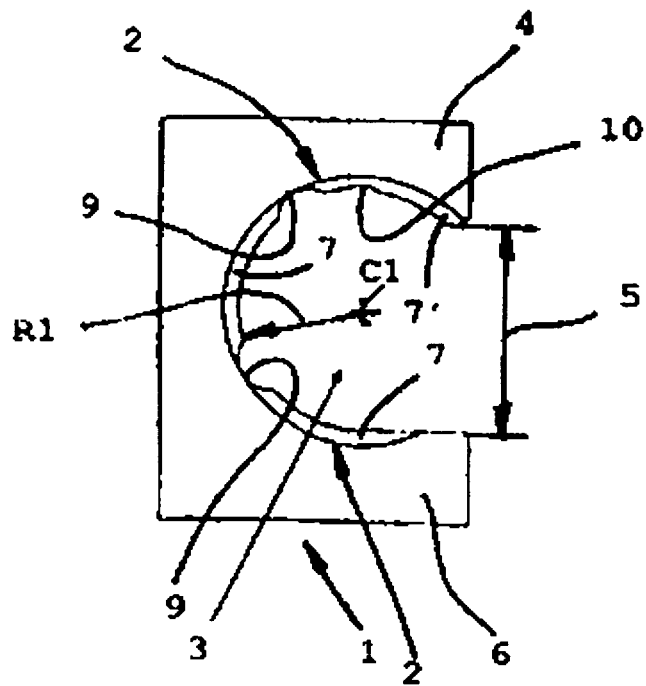
FIG. 1 shows a side view of a holder forming a part of the tool.

The holder 1 shown schematically in FIGS. 1 and 2 comprises an insert pocket 3, which at its upper part is defined by a clamping arm 4 and at its lower part is defined by a support section 6. The insert pocket 3 is provided with an opening 5. First holding means are provided on the periphery 2 of the insert pocket 3 in the shape of ridges 7, 7', which in the shown embodiment are three pieces. The portions of the ridges 7, 7' located closest to a first center C1 of the insert pocket 3 are in a side view generally defined by a circular arc. Said circular arc is generated by rotating a first radius R1 around the first center C1. The height of the ridges 7, 7' is 5-25% of the radius R1.

As shown in FIG. 1 the ridges 7 are spaced by two first recesses 9, which have a depth in principle corresponding to the height of the ridges 7. The partition between adjacent recesses 9 is 90°. In the view shown in FIG. 1 the recesses 9 have a rounded shape. The topmost located ridge 7' in FIG. 1 is provided with a second recess 10, which has a smaller depth than the first recess 9. Also the second recess 10 has a rounded shape in the view shown in FIG. 1. The second recess 10 is shorter than the first recess 9 in the lateral direction of the holder 1.

Figure 4:
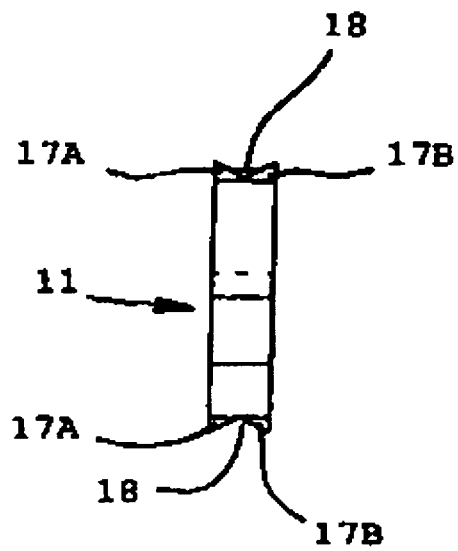
FIG. 4 shows a right-hand view of the cutting insert according to FIG. 3.
Figure 3:
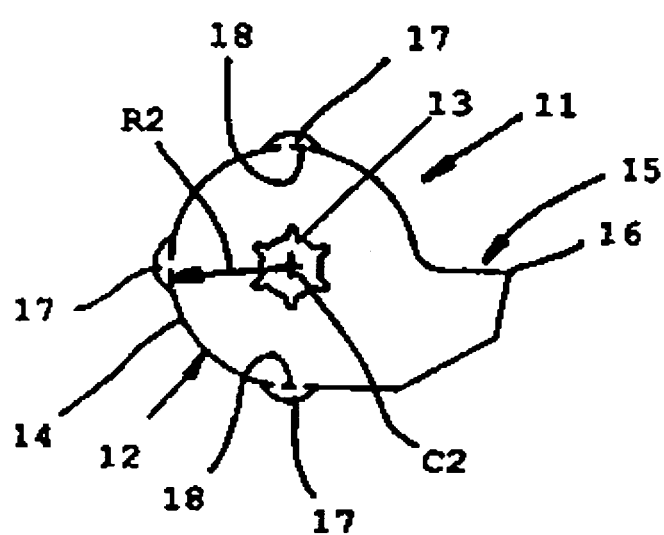
FIG. 3 shows a side view of a cutting insert forming a part of the tool.

The cutting insert 11 shown in FIGS. 3 and 4 is generally disc-shaped and has an anchor section 12, which in a side view generally has the shape of a circular arc. The cutting insert 11 is provided with a central hole 13, which in the shown embodiment is provided with radial cut-outs. The cutting insert 11 also comprises a radially protruding cutting edge section 15, a cutting edge 16 for grooving or parting being provided on its radially outermost located portion, relative to the center C2 of the hole 13.

In the shown embodiment the anchor section 12 along its circumference is provided with three lip pairs 17 protruding from the circumference 14, wherein the partition between adjacent lip pairs 17 is 90°. The lip pairs 17 have in a side view a rounded shape and in terms of dimensions they are adapted to recesses 10 along the periphery of the holder 1. Each lip pair comprises two lips 17a, 17b, which have a V-shaped groove 18 in-between. The groove 18 constitutes a second holding means. Every single one of the V-shaped grooves 18 has a certain extension along the circumference 14 of the anchor section 12. Normally the grooves 18 have the same extension along the circumference 14 as the associated lips 17. The V-shaped bottom of the grooves 18 is located centrally on the envelope surface of the anchor section 12, seen in the thickness direction of the anchor section 12. In a side view, as illustrated by FIG. 3, the groove 18 is defined by a circular arc, which is generated by a second radius R2 being rotated around a second center point C2.

When mounting the cutting insert 11 in the holder 1, this is done from the side. At the initial position the holder 1 and the cutting insert 11 are positioned parallel to each other and the anchor section 12 of the cutting insert 11 is located right in front of the insert pocket 3, wherein the holder 1 and the cutting insert 11 in principle have the orientation with respect to each other as shown in FIG. 5. Subsequently the holder 1 and the cutting insert 11 are displaced with respect to each other, wherein the holder 1 and the cutting insert 11 still are parallel to each other, until the cutting insert 11 is received by the insert pocket 3. Thereby two of the lip pairs 17 will be received by the first recesses 9 while the third lip pair 17 is located in connection with the opening 5 of the holder 1. When the holder 1 and the cutting insert 11 are located in a common plane the cutting insert 11 is rotated with respect to the holder 1, from the position shown in FIGS. 5 and 6 to the position shown in FIGS. 7 and 8. Thereby the ridges 7, 7' of the insert pocket 3 will be received by the V-shaped grooves 18 of the respective lip pair 17. As shown in FIGS. 7, 8 and 9 the cutting insert 11 will thus be guided by the holder 1 at six points, two in each lip pair 17, along the periphery of the insert pocket 3. This guarantees that the cutting insert 11 obtains an extraordinarily rigid anchorage in the holder 1.

The rotation of the cutting insert 11 is suitably done with a key (not shown) that is placed in the hole 13, wherein the key may be of the type Torx® (registrered trade mark of Camcar Textron).

By studying FIGS. 5 and 7 it is obvious that when the cutting insert 11 has been rotated to the position shown in FIG. 7 the topmost lip 17 will come to engagement with the second recess 10, wherein the topmost lip 17 snaps into the second recess 10. The rotation of the cutting insert 11 from the position shown in FIGS. 5 and 6 to the position shown in FIGS. 7 and 8 will be done during deflection of the clamping arm 4. By the lip 17 snapping into the second recess 10 an indication is obtained that the cutting insert 11 has obtained its operative, correct position. A portion of the support section 6 at the opening 5 will preferably be struck by a straight portion of the lower portion of the cutting insert 11 in connection with the lip 17 snapping into the second recess 10, to support the cutting insert during machining. Since the cutting edge section 15 of the cutting insert 11 normally is not subjected to any upwardly directed force the cooperating position between holder 1 and the cutting insert 11 as is shown in FIGS. 7 and 8 will function excellently in normal cases.

Figure 13:
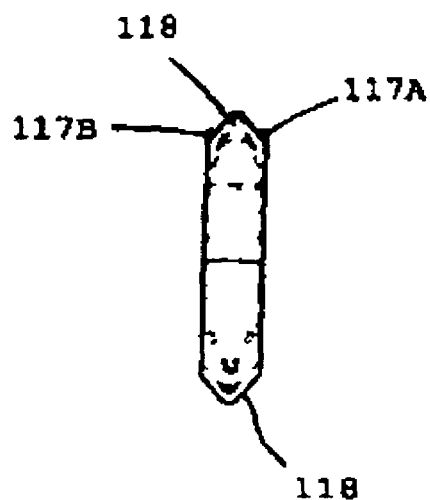
FIG. 13 shows a right-hand view of the cutting insert according to FIG. 12.
Figure 12:
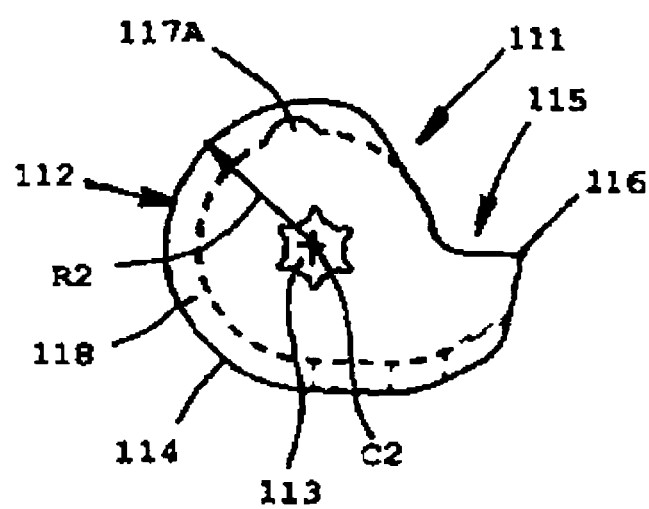
FIG. 12 shows a side view of a cutting insert forming a part of the tool according to the first alternative embodiment.
Figure 11:
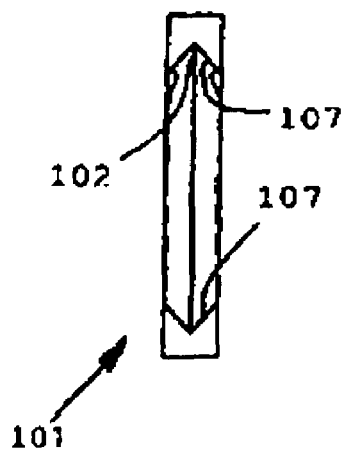
FIG. 11 shows a right-hand view of the holder according to FIG. 10.

The cutting insert 111 forming a part of the tool is generally disc-shaped and has an anchor section 112, the circumference 114 of which in a side view is generally defined by a circular arc, wherein this circular arc is generated by a second radius R2 being rotated around a second center point C2. The cutting insert 111 is provided with a central hole 113. The cutting insert 111 also comprises a radially protruding cutting edge section 115, a cutting edge 116 for grooving or parting being provided on its radially outermost located portion, relative to the center of the hole 113. The anchor section 112 is along its circumference 114 provided with a continuous ridge 118, which generally has V-shaped cross-section and constitutes second holding means of the cutting insert 111. The tip of the ridge 118 coincides with the circumference of the anchor section 112. The cutting insert III also has a lip pair 117A, 117B in the area of the upper part of the anchor section 112 in FIGS. 12 and 13, wherein each of the lips 117A, 117B has a surface that coincides with the adjoining side surface of the cutting insert 111. The lips 117A, 117B of each pair are located, in a side view, right in front of each other, on each side of the ridge 118, and they have identical dimensions. The dimensions of the lips 117A, 117B are also adapted to the dimensions of the recess pairs 109 and 110, which will be illustrated below.

Figure 10:
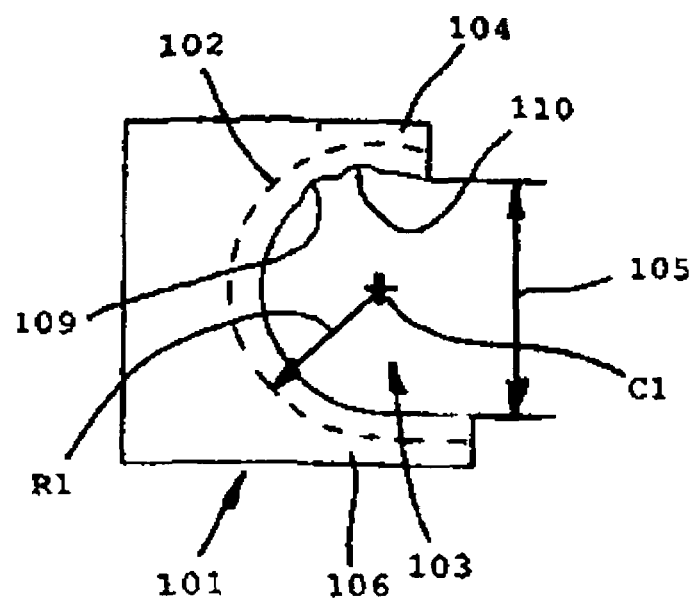
FIG. 10 shows a side view of a holder forming a part of the tool at a first alternative embodiment according to the present invention.

When mounting the cutting insert 111 in the holder 101 this is done from the front, i.e. from the right in FIGS. 10 and 14. Thereby the cutting insert 111 is orientated with respect to the holder 101 as is shown in FIGS. 14 and 15, said lips 117A, 117B not interfering with the opening 105 when the cutting insert 111 is brought into the insert pocket 103. When the lips 117A, 117B are received by their first respective recess pair 109 of the holder 101 the first part of the mounting process is finished. In the next part of the mounting process the cutting insert 111 is rotated from the position shown in FIGS. 14 and 15 to the position shown in FIGS. 16 and 17. Thereby, the lips 117A, 117B will be transferred from the first recess pair 109 to the second recess pair 110, whereby this transfer will occur during simultaneous deflection of the clamping arm 104. When the tips 117A, 117B snaps into the second recesses 110 it is an indication that the cutting insert 111 has obtained a correct position in the holder 101, wherein also the ridge 118 has correctly occupied the groove 107. A portion of the support section 106 at the opening 105 will preferably be struck by a straight portion of the lower portion of the cutting insert 111 in connection with the lips 117A and 117B snapping into the second recess 110, to support the cutting insert during machining. Especially when it comes the second recess pair 110 and the lips 117A, 117B it is important that these have such a The cutting insert 111 forming a part of the tool is generally disc-shaped and has an anchor section 112, the circumference 114 of which in a side view is generally defined by a circular arc, wherein this circular arc is generated by a second radius R2 being rotated around a second center point C2. The cutting insert 111 is provided with a central hole 113. The cutting insert 111 also comprises a radially protruding cutting edge section 115, a cutting edge 116 for grooving or parting being provided on its radially outermost located portion, relative to the center of the hole 113. The anchor section 112 is along its circumference 114 provided with a continuous ridge 118, which generally has V-shaped cross-section and constitutes second holding means of the cutting insert 111. The tip of the ridge 118 coincides with the circumference of the anchor section 112. The cutting insert Ill also has a lip pair 117A, 117B in the area of the upper part of the anchor section 112 in FIGS. 12 and 13, wherein each of the lips 117A, 117B has a surface that coincides with the adjoining side surface of the cutting insert 111. The lips 117A, 117B of each pair are located, in a side view, right in front of each other, on each side of the ridge 118, and they have identical dimensions. The dimensions of the lips 117A, 117B are also adapted to the dimensions of the recess pairs 109 and 110, which will be illustrated below.

When mounting the cutting insert 111 in the holder 101 this is done from the front, i.e. from the right in FIGS. 10 and 14. Thereby the cutting insert 111 is orientated with respect to the holder 101 as is shown in FIGS. 14 and 15, said lips 117A, 117B not interfering with the opening 105 when the cutting insert 111 is brought into the insert pocket 103. When the lips 117A, 117B are received by their first respective recess pair 109 of the holder 101 the first part of the mounting process is finished. In the next part of the mounting process the cutting insert 111 is rotated from the position shown in FIGS. 14 and 15 to the position shown in FIGS. 16 and 17. Thereby, the lips 117A, 117B will be transferred from the first recess pair 109 to the second recess pair 110, whereby this transfer will occur during simultaneous deflection of the clamping arm 104. When the tips 117A, 117B snaps into the second recesses 110 it is an indication that the cutting insert 111 has obtained a correct position in the holder 101, wherein also the ridge 118 has correctly occupied the groove 107. A portion of the support section 106 at the opening 105 will preferably be struck by a straight portion of the lower portion of the cutting insert 111 in connection with the lips 117A and 117B snapping into the second recess 110, to support the cutting insert during machining. Especially when it comes the second recess pair 110 and the lips 117A, 117B it is important that these have such a mutual dimensional relation that the lips 117A, 117B are conveyed a satisfactory support when they are received in the second recess pair 110.

When mounting the cutting insert 111 in the holder 101 this done from the front, i.e. from the right in FIGS. 10 and 14. Thereby the cutting insert 111 is orientated with respect to the holder 101 as is shown in FIGS. 14 and 15, said lips 117A, 117B not interfering with the opening 105 when the cutting insert 111 is brought into the insert pocket 103. When the lips 117A, 117B are received by their first respective recess pair 109 of the holder 101 the first part of the mounting process is finished. In the next part of the mounting process the cutting insert 111 is rotated from the position shown in FIGS. 14 and 15 to the position shown in FIGS. 16 and 17. Thereby, the lips 117A, 117B will be transferred from the first recess pair 109 to the second recess pair 110, whereby this transfer will occur during simultaneous deflection of the clamping arm 104. When the lips 117A, 117B snaps into the second recesses 110 it is an indication that the cutting insert 11 has obtained a correct position in the holder 101, wherein also the ridge 118 has correctly occupied the groove 107. A portion of the support section 106 at the opening 105 will preferably be struck by a straight portion of the lower portion of the cutting insert 111 in connection with the lips 117A and 117B snapping into the second recess 110, to support the cutting insert during machining. Especially when it comes the second recess pair 110 and the lips 117A, 117B it is important that these have such a mutual dimensional relation that the lips 117A, 117B are conveyed a satisfactory support when they are received in the second recess pair 110.

In FIGS. 19-27 a second alternative embodiment of the invention is shown. The holder 201 forming a part of the tool comprises an insert pocket 203, which at its upper part is defined by a clamping arm 204 and at its lower part is defined by a support section 206. In a side view the parts of the periphery 202 of the insert pocket 203 that cooperate with the cutting insert 211 are generally defined by circular arcs. An opening 205 is connected to the insert pocket 203. A clear principal difference in relation to the holder 101 in the above-described first alternative embodiment is that the insert pocket 203 has a clearance 208 in a direction away from the opening 205. The clearance is formed due to the cutting insert 211 having a special shape, which will be described below. In the corresponding way as in the embodiment according to FIGS. 10-18 the insert pocket 203 has second holding means extending along the periphery that however are divided into two grooves 207 by the clearance 208. The grooves 207 generally have V-shaped cross-section and the bottom of the grooves 207 define the periphery 202 of the insert pocket 203, which has the shape of a circular arc. This circular arc is generated by a first radius R1 being rotated around a first center point C1 of the insert pocket 203.

The upper part of the holder 201 is provided with a first recess pair 210A and provided with a second recess pair 210B at its lower part, wherein these recess pairs 210A, 210B have an extension laterally to the principle plane of the holder 201. With principal plane is meant a plane parallel to the opposite faces of the holder 201. The recesses 210A, 210B cut through the side faces of the holder 201. Preferably both recess pairs 210A, 210B are identical.

The cutting insert 211 forming a part of the tool is generally disc-shaped and has an anchor section 212, the circumference 214 of which in a side view is generally defined by a circular arc, wherein this circular arc is generated by a second radius R2 being rotated around a second center point C2. The cutting insert 211 is provided with a central hole 213. An important principal difference between the cutting insert 211 and the above-described cutting insert 111 is that the cutting insert 211 comprises two radially protruding cutting edge sections 215 with a 180° partition along the circumference. The anchor section 212 is provided with two ridges 218 along its circumference 214, which generally have V-shaped cross-sections and constitute second holding means of the cutting insert 211. The tips of the ridges 218 coincide with the circumference 214. The cutting insert 211 also comprises four lips, which are provided in pairs, lips in each pair being provided on opposed sides on the anchor section 212, and each lip 217 has a surface that coincides with the adjoining side surface of the cutting insert 211. The lips 217 are pair wise located right in front of each other in a side view, on each side of the respective ridge 218, and they have identical dimensions. The dimensions of the lips 117A, 117B are also adapted to the dimensions of the recesses 210A and 210B, in the corresponding way as in the first alternative embodiment.

Figure 19:
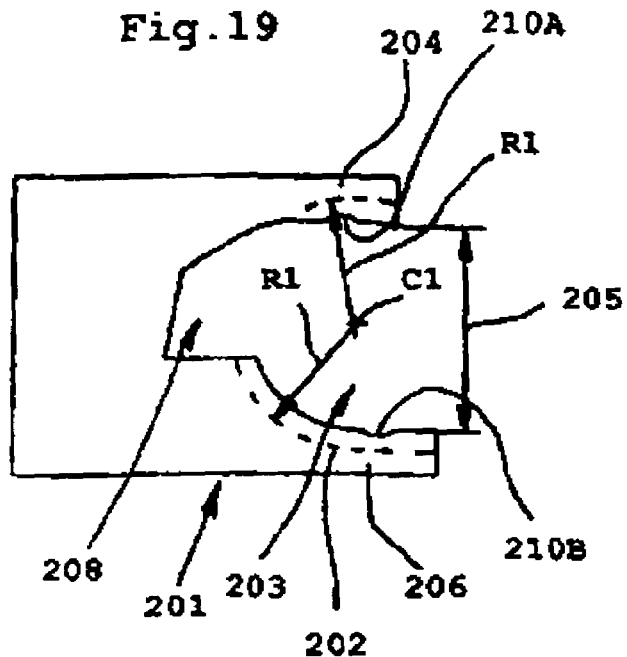
FIG. 19 shows a side view of a holder forming a part of the tool of a second alternative embodiment according to the present invention.
Figure 20:
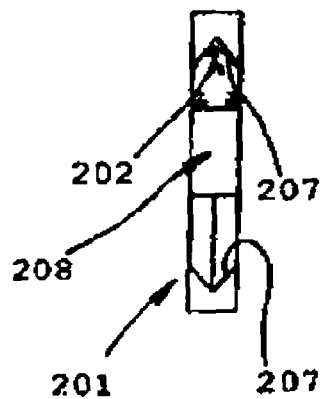
FIG. 20 shows a right-hand view of the holder according to FIG. 19.
Figure 21:
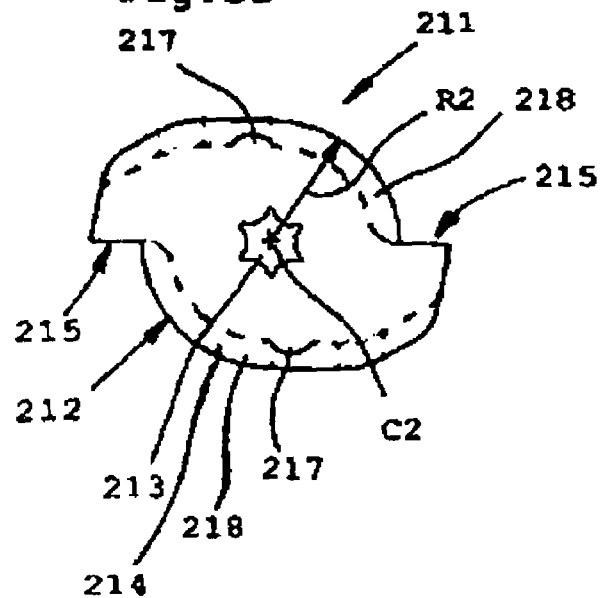
FIG. 21 shows a side view of a cutting insert forming a part of the tool according to the second alternative embodiment.
Figure 22:
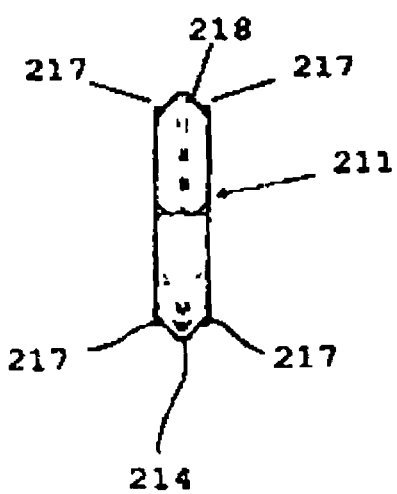
FIG. 22 shows a right-hand view of the cutting insert according to FIG. 21.
Figure 23:
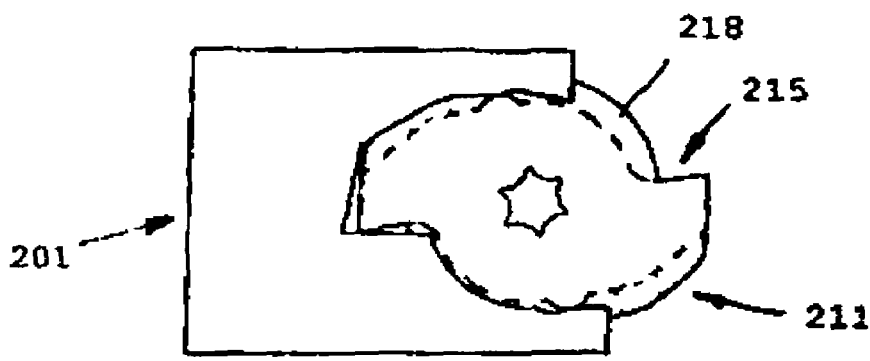
FIG. 23 shows a side view during mounting of the cutting insert in the holder.
Figure 27:
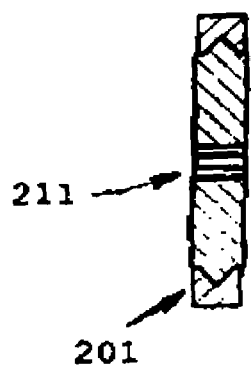
FIG. 27 shows a cross-section along the line XXVII-XXVII in FIG. 25.
Figure 25:
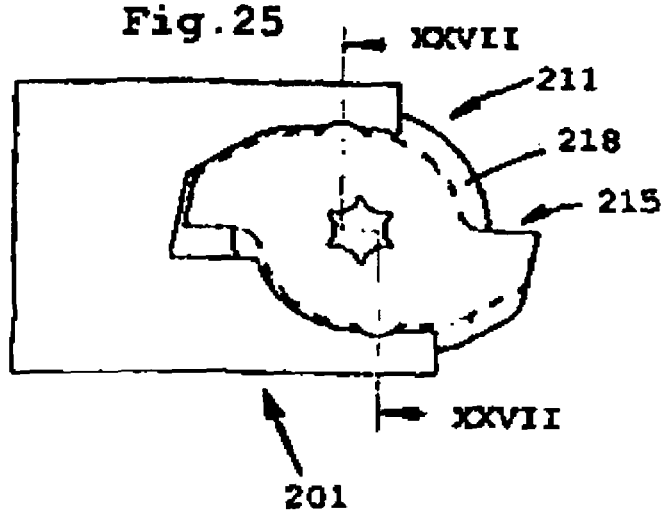
FIG. 25 shows a side view of when the cutting insert is mounted in the holder.
Figure 26:
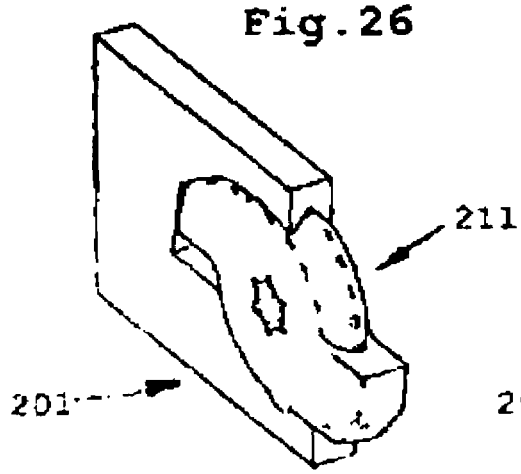
FIG. 26 shows a perspective view obliquely from the front when the cutting insert is mounted in the holder.
Figure 24:
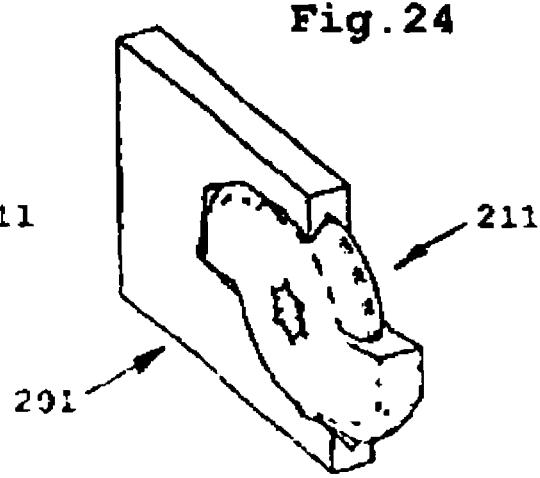
FIG. 24 shows a perspective view obliquely from the front during mounting of the cutting insert in the holder.

When mounting the cutting insert 211 in the holder 201 this is done in principle in the same way as in the first alternative embodiment of a tool according to the present invention, i.e. from the right in FIGS. 19 and 23. Thereby the cutting insert 211 is orientated with respect to the holder 201 as is shown in FIGS. 23 and 24, wherein the lips 217 do not interfere with the opening 205 when the cutting insert 211 is brought into the insert pocket 203. When the cutting insert 211 is wholly inserted into the insert pocket 203, as illustrated by FIGS. 23 and 24, of the holder 201 the first part of the mounting process is finished. Thereby the lip pairs 217 are located beside the recess pairs 210A and 210B. In next part of the mounting process the cutting insert 211 is rotated from the position shown in FIGS. 23 and 24 to the shown situation in FIGS. 25 and 26. Thereby each lip pair 217 will be received by the respective recess pair 210A, 210B. It is important that the recess pairs 210A, 210B and the lip pairs 217 have such a mutual dimensional relation that the lips 217 are conveyed a satisfactory support when they are snapped into the recesses 210A, 210B. In connection with the lips 217 being received by the recesses 210A, 210B the ridges 218 will also in a satisfactory way be received by the grooves 207. A portion of the support section 206 at the opening 205 will preferably be struck by a straight portion of the lower portion of the cutting insert 211 in connection with the lips 217 snapping into the second recess 210A and 210B, to support the cutting insert during machining. The cutting insert 211 is thereby steadily secured in the holder 201.

In FIGS. 28-34 a third alternative embodiment of the invention is shown. The holder 301 forming a part of the tool comprises an insert pocket 303, which partly is defined by an engagement portion 304 and partly by a support section 306. The insert pocket 303 is provided with an opening 305. First holding means are provided in the shape of ridges 307 on the periphery of the insert pocket 303, which in the shown the embodiment are three pieces. In a side view the sections of the ridges 307 located closest to a first center C1 of the insert pocket 303 are generally defined by a circular arc. This circular arc is generated by a first radius R1 being rotated around the first center C1. The height of the ridges 307 is 5-25% of the radius R1.

As shown in FIG. 28 the ridges 307 are spaced by two first recesses 309, which have a depth that in principle corresponds to the height of the ridges 307. The partition between the adjacent recesses 309 is 90°. In the view shown in FIG. 28 the recesses 309 have a rounded shape.

The cutting insert 311 shown in FIGS. 30 and 31 is generally disc-shaped and has an anchor section 312, which in a side view generally has the shape of a circular arc. The cutting insert 311 is provided with a central hole 313, which in the shown embodiment is provided with radial cut-outs. The cutting insert 311 also comprises a radially protruding, fingerlike cutting edge section 315, a cutting edge 316 for grooving or parting being provided on its radially outermost located portion relative to the center C2 of the hole 313.

In the shown embodiment the anchor section 312 along its circumference is provided with three lip pairs 317 protruding from the circumference 314. The partition between the lips 317 is 90°. The lips 317 have in side view a rounded shape and in terms of dimension they are adapted to the recesses 310 along the periphery of the holder 301. Each lip pair comprises two lips 317A, 317B, which in-between have a V-shaped groove 318. The groove 318 constitutes a second holding means. Each of the V-shaped grooves 318 has a certain extension along the circumference 314 of the anchor section 312. Normally the grooves 318 have a corresponding extension along the circumference 314 as the associated lips 317. The bottom of the V-shaped grooves 318 is located right in the middle of the envelope surface of the anchor section 312, seen in the thickness direction of the anchor section 312. In a side view, as illustrated by FIG. 30, the groove 318 is defined by a circular arc, which is generated by a second radius R2 being rotated around a second center point C2.

When mounting the cutting insert 311 in the holder 301 this is done from the side. In the initial position the holder 301 and the cutting insert 311 are positioned parallel to each other and the anchor section 312 of the cutting insert 311 is located right in front of the insert pocket 303, wherein the holder 301 and the cutting insert 311 in principle have the orientation with respect to each other as shown in FIG. 32. Subsequently the holder 311 and the cutting insert 311 are displaced with respect to each other, wherein the holder 301 and the cutting insert 311 still are parallel to each other, until the cutting insert 311 is received by the insert pocket 303. Thereby the two lip pairs 317 will be received by the first recesses 309. When the holder 301 and the cutting insert 311 are located in a common plane the cutting insert 311 is rotated with respect to the holder 311, from the position shown in FIG. 32 to the position shown in FIGS. 33 and 34. Thereby the ridges 307 of the insert pocket 303 will be received by the V-shaped grooves 318 of the respective lip pair 317. As shown in FIGS. 33 and 34 the cutting insert 311 will thus be guided by the holder 311 at four points, two in each lip pair 317, along the periphery of the insert pocket 303. This guarantees the cutting insert 311 to obtain a rigid anchorage in the holder 301.

The rotation of the cutting insert 311 is suitably done with a key (not shown) that is placed in the hole 313, wherein the key may be of the type Torx®.

By studying FIGS. 32 and 33 it is obvious that when the cutting insert 311 has been rotated to the shown position the lower side of the fingerlike cutting edge section 315 will abut against the support section 306 at the opening 305, to support the cutting insert during machining. Since the cutting edge section 315 of the cutting insert 311 normally is not subjected to any upwardly directed force the cooperating position between the holder 311 and the cutting insert 311 as is shown in FIGS. 33 and 34 will function excellently in normal cases.

Generally, in the present invention the circular arc shape of both insert pockets and cutting inserts bring about considerable advantages at production of holders and cutting inserts. Thus, a holder and a cutting insert can be made with an improved exactness in the sense of tolerances. Also generally, the periphery of the insert pocket shall correspond to a circular arc defining a center angle that is greater than 180°. The cutting insert is locked with respect to the holder when it is brought to assume its operative position in the holder. The mounting of the cutting insert in the holder is extraordinarily simple. The cutting insert obtains an extraordinary rigid mounting in the holder. The user will obtain an indication when the cutting insert has obtained a correct, operative position in the holder.

In the embodiments described above the center hole 13; 113; 213; 313 is provided with a key of the type Torx®. Within the limits of the present invention however one can consider other types of generally occurring keys.

Generally, in the above-described embodiments the holding means and the anchor sections can be inverted, wherein for example in the case described in FIGS. 1-9 this means that the holder is provided with grooves while the cutting insert is provided with ridges.

When it comes to the embodiment described in FIGS. 19-27 this can be modified so that the cutting insert only has one lip while still the holder is provided with two recesses.

The cutting insert forming a part of the tool according to the present invention need not be provided with a centrally located key grip. A conceivable alternative is that the cutting insert is provided with two diametrically arranged holes, opposed with regard to the center, wherein pins of a key is brought to cooperate with these holes. This constructive design brings about that high torque more easily can be transferred to the cutting insert in order to bring the same to rotate in the holder.

The above-described embodiments of the invention relate to tools for grooving or parting. However, the principle according to the present invention for securing cutting inserts in holders can also be used at for example disc milling cutters or other rotary tools (shoulder milling cutters). In that case the holder normally comprises several cutting insert pockets.

The invention described herein is susceptible to variations, modifications and/or additions other than those specifically described and it is to be understood that the invention includes all such variations, modifications and/or additions which fall within the scope of the claims.

The disclosures in Swedish patent application No. 0401072-4, from which this application claims priority are incorporated herein by reference.

What is claimed is:

1. A tool for chip removing machining, comprising a holder and at least one cutting insert received in the holder, the holder comprising at least one insert pocket for receiving the cutting insert and an opening connected to the insert pocket, the insert pocket having a first holding member provided along a periphery of the insert pocket, and the cutting insert having an anchor section and an edge portion connected to the anchor section, a second holding member being provided along a periphery of the anchor section, the first and the second holding members cooperating when the cutting insert is mounted in the insert pocket, wherein the periphery of the insert pocket, at least partly, is defined by at least one circular arc of the pocket, the at least one pocket arc having a pocket arc center of rotation, and at least a portion of the second holding member located away from a cutting insert center is defined by a circular arc of the insert having an insert arc center of rotation, wherein the second holding member comprises a plurality of holding members distributed along the periphery of the anchor section, the plurality of holding members located away from the cutting insert center being defined by opposing surfaces forming a generally V-shape, the opposing surfaces being at least partially defined by circular arcs of the insert, the circular arcs having a common center of rotation at the insert arc center of rotation, and the circular arcs of the insert being located at the same distance from the insert arc center of rotation.

2. The tool according to claim 1, wherein the plurality of holding members are parts of a holding member extending continuously along the periphery of the anchor section.

3. The tool according to claim 1, wherein the holder and the cutting insert have cooperating locking devices comprising lips and recesses.

4. The tool according to claim 3, wherein the lips are provided on the cutting insert at the periphery of the anchor section, and the recesses are provided on the holder at the periphery of the insert pocket.

5. The tool according to claim 4, wherein the lips are provided in pairs, and the at least one second holding member is provided between at least one pair of lips.

6. The tool according to claim 5, wherein the recesses are provided in pairs, and the first holding member is provided between at least one pair of recesses.

7. The tool according to claim 3, wherein the lips are provided in pairs, and the at least one second holding member is provided between at least one pair of lips.

8. The tool according to claim 7, wherein the recesses are provided in pairs, and the first holding member is provided between at least one pair of recesses.

9. The tool according to claim 3, wherein the recesses are provided in pairs, and the first holding member is provided between at least one pair of recesses.

10. The tool according to claim 3, wherein the first holding member comprises ridges, and the second holding member comprises grooves.

11. The tool according to claim 3, wherein the first holding member comprises grooves, and the second holding member comprises ridges.

12. The tool according to claim 1, wherein the first holding member comprises ridges, and the second holding member comprises grooves.

13. The tool according to claim 1, wherein the first holding member comprises grooves, and the second holding member comprises ridges.

14. A cutting insert intended to form part of a tool for chip removing machining, the cutting insert comprising an anchor section and a holding member provided along the periphery of the anchor section, wherein at least a portion of the holding member located away from a cutting insert center is defined by a circular arc of the insert having an insert arc center of rotation, wherein the holding member comprises a plurality of holding members distributed along the periphery of the anchor section, the plurality of holding members located away from the cutting insert center being defined by opposing surfaces forming a generally V-shape, the opposing surfaces being at least partially defined by circular arcs of the insert, the circular arcs having a common center of rotation at the insert arc center of rotation, and the circular arcs of the insert being located at the same distance from the insert arc center of rotation.

15. The cutting insert according to claim 14, wherein the holding member comprises a holding member extending continuously along the periphery of the anchor section.

16. The cutting insert according to claim 14, wherein lips are provided on a periphery of the anchor section.

17. The cutting insert according to claim 16, wherein the lips are provided in pairs, and the holding member is provided between at least one pair of lips.

* * * * *